US010942680B2

(12) United States Patent
Lin et al.

(10) Patent No.: US 10,942,680 B2
(45) Date of Patent: Mar. 9, 2021

(54) DATA WRITING METHOD, MEMORY STORAGE DEVICE AND MEMORY CONTROL CIRCUIT UNIT

(71) Applicant: PHISON ELECTRONICS CORP., Miaoli (TW)

(72) Inventors: Ping-Chuan Lin, Taipei (TW); Yi-Hsuan Lin, New Taipei (TW); Bing-Hong Wu, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/503,593

(22) Filed: Jul. 4, 2019

(65) Prior Publication Data
US 2020/0371712 A1    Nov. 26, 2020

(30) Foreign Application Priority Data

May 22, 2019  (TW) ................................ 108117725

(51) Int. Cl.
*G06F 3/06* (2006.01)
*G06F 12/10* (2016.01)
(52) U.S. Cl.
CPC .......... *G06F 3/0659* (2013.01); *G06F 3/0604* (2013.01); *G06F 3/0652* (2013.01); *G06F 3/0679* (2013.01); *G06F 12/10* (2013.01); *G06F 2212/1044* (2013.01); *G06F 2212/657* (2013.01)
(58) Field of Classification Search
CPC .... G06F 3/0604; G06F 3/0652; G06F 3/0659; G06F 3/0679; G06F 12/10; G06F 2212/1044; G06F 2212/657
See application file for complete search history.

(56) References Cited

U.S. PATENT DOCUMENTS

| 5,890,169 A * | 3/1999 | Wong ................... G06F 16/1724 |
| 9,563,549 B2 * | 2/2017 | Ahn ..................... G06F 12/0246 |
| 2012/0317365 A1 * | 12/2012 | Elhamias ............. G06F 12/0862 711/141 |

(Continued)

FOREIGN PATENT DOCUMENTS

TW          I571882          2/2017

OTHER PUBLICATIONS

"Office Action of Taiwan Counterpart Application", dated Jul. 27, 2020, p. 1-p. 5.

*Primary Examiner* — Eric T Oberly
(74) *Attorney, Agent, or Firm* — JCIPRNET (57) ABSTRACT

A data writing method, a memory storage device, and a memory control circuit unit are provided. The method includes: receiving a first data and writing the first data to at least one first physical programming unit of a first physical erasing unit; receiving a second data; temporarily storing the second data to a temporary storage area if a data length of the second data is less than a predefined value; receiving a third data; writing the third data to at least one second physical programming unit of the first physical erasing unit if a logical address storing the first data is consecutive with a logical address storing the third data; and moving the second data from the temporary storage area to at least one second physical programming unit of the first physical erasing unit if the logical address storing the first data is not consecutive with the logical address storing the third data.

24 Claims, 8 Drawing Sheets

(56) References Cited

U.S. PATENT DOCUMENTS

| | | | |
|---|---|---|---|
| 2013/0166825 A1* | 6/2013 | Kim | G06F 12/0246 |
| | | | 711/103 |
| 2013/0326119 A1 | 12/2013 | Lee et al. | |
| 2016/0284414 A1* | 9/2016 | Lin | G11C 16/14 |
| 2017/0286287 A1* | 10/2017 | Hady | G06F 12/0246 |
| 2019/0227929 A1* | 7/2019 | Lin | G06F 3/0604 |
| 2019/0243723 A1* | 8/2019 | Van Sickle | G11C 11/4074 |

* cited by examiner

DATA WRITING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 108117725, filed on May 22, 2019. The entirety of the above-mentioned patent application is hereby incorporated by reference herein and made a part of this specification.

BACKGROUND

Technical Field

The disclosure relates to a memory management technique, and more particularly, to a data writing method, a memory storage device, and a memory control circuit unit.

Description of Related Art

As digital cameras, mobile phones, and MP3 players have been growing rapidly in recent years, consumers' demand for storage media has also been growing significantly. With characteristics including data non-volatility, energy saving, small size, lack of mechanical structures, etc., rewritable non-volatile memory modules (e.g., flash memories) are ideal to be built in various portable multi-media devices such as those listed above.

Figure 1:
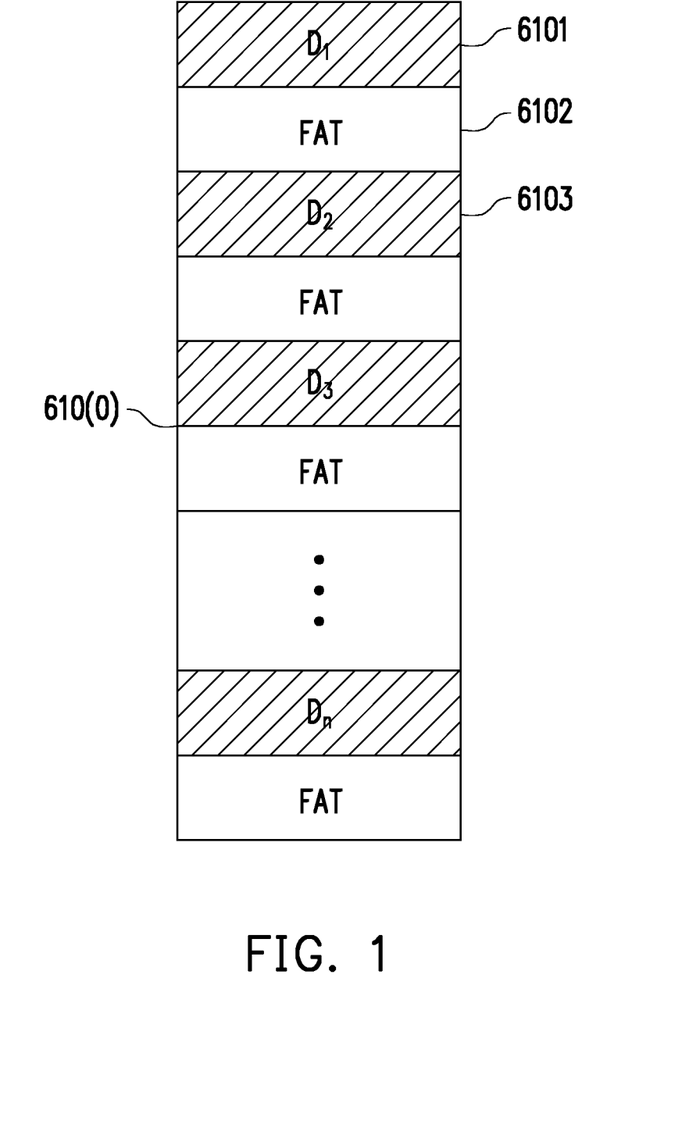
FIG. 1 is a schematic diagram illustrating related art according to an exemplary embodiment of the disclosure.

FIG. 1 is a schematic diagram illustrating related art according to an exemplary embodiment of the disclosure. As shown in FIG. 1, during data writing, the system data (e.g., File Allocation Table (FAT)) and the user data (e.g., including a first data D1, a second data D2, a third data D3 . . . an Nth data Dn) are alternately written to a flash memory 406. The order in which the host terminal writes the data is: first writing the first data D1 to a physical programming unit 6101 of a physical erasing unit 610(0) in the flash memory 406, then writing the system data to a physical programming unit 6102, next writing the second data D2 to a physical programming unit 6103, and then updating the system data. Since the system data and the user data are alternately written to the flash memory 406, the user data written to the flash memory 406 are actually physically non-consecutive.

In an algorithm based on physical programming units (i.e., a page-based algorithm), the order in which data is written to the flash memory is the same as the order in which the host terminal writes to the flash memory. In the same physical erasing unit, since the update of the system data causes the old system data to be invalid, many invalid data segments are present in the same physical erasing unit. If these invalid data segments account for 10%, it means that 90% of the data needs to be moved during the garbage collection operation. Since these invalid and physically non-consecutive data segments are excessive and dispersedly distributed, a small amount may remain during garbage collection, which decreases the efficiency of garbage collection. In view of the above, how to improve the efficiency of garbage collection is one of the techniques that people skilled in the art strive to develop.

SUMMARY

The disclosure provides a data writing method, a memory storage device, and a memory control circuit unit.

An exemplary embodiment of the disclosure provides a data writing method for a rewritable non-volatile memory module. The rewritable non-volatile memory module includes a plurality of physical erasing units and each of the physical erasing units has a plurality of physical programming units. The method includes: receiving a first data from a host system and writing the first data to at least one first physical programming unit of a first physical erasing unit among the plurality of physical erasing units; and receiving a second data from the host system. The method further includes: temporarily storing the second data in a temporary storage area, receiving a third data from the host system after receiving the second data, and determining whether a logical address storing the first data is consecutive with a logical address storing the third data. The method further includes: writing the third data to at least one second physical programming unit of the first physical erasing unit if the logical address storing the first data is consecutive with the logical address storing the third data; and moving the second data from the temporary storage area to at least one second physical programming unit of the first physical erasing unit if the logical address storing the first data is not consecutive with the logical address storing the third data. The at least one second physical programming unit is arranged after the at least one first physical programming unit.

An exemplary embodiment of the disclosure provides a memory storage device including: a connection interface unit, a rewritable non-volatile memory module, and a memory control circuit unit. The connection interface unit is configured to couple to a host system. The rewritable non-volatile memory module includes a plurality of physical erasing units and each of the physical erasing units has a plurality of physical programming units. The memory control circuit unit is coupled to the connection interface unit and the rewritable non-volatile memory module. The memory control circuit unit is configured to receive a first data from the host system and write the first data to at least one first physical programming unit of a first physical erasing unit among the plurality of physical erasing units. The memory control circuit unit is configured to receive a second data from the host system. The memory control circuit unit is configured to temporarily store the second data in a temporary storage area, receive a third data from the host system after receiving the second data, and determine whether a logical address storing the first data is consecutive with a logical address storing the third data. Moreover, if the logical address storing the first data is consecutive with the logical address storing the third data, the memory control circuit unit is configured to write the third data to at least one second physical programming unit of the first physical erasing unit. If the logical address storing the first data is not consecutive with the logical address storing the third data, the second data is moved from the temporary storage area to at least one second physical programming unit of the first physical erasing unit. The at least one second physical programming unit is arranged after the at least one first physical programming unit.

An exemplary embodiment of the disclosure provides a memory control circuit unit configured to write data to a rewritable non-volatile memory module. The rewritable non-volatile memory module includes a plurality of physical erasing units and each of the physical erasing units has a plurality of physical programming units. The memory control circuit unit includes: a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to receive a first data from the host system and write the first data to at least one first physical programming unit of a first physical erasing unit among the plurality of physical erasing units. The memory management circuit is configured to receive a second data from the host system. The memory management circuit is configured to temporarily store the second data in a temporary storage area, receive a third data from the host system after receiving the second data, and determine whether a logical address storing the first data is consecutive with a logical address storing the third data. Moreover, if the logical address storing the first data is consecutive with the logical address storing the third data, the memory management circuit is configured to write the third data to at least one second physical programming unit of the first physical erasing unit. If the logical address storing the first data is not consecutive with the logical address storing the third data, the memory management circuit is configured to move the second data from the temporary storage area to at least one second physical programming unit of the first physical erasing unit. The at least one second physical programming unit is arranged after the at least one first physical programming unit.

Based on the above, in the data writing method, the memory storage device, and the memory control circuit unit of the disclosure, during data writing, the user data having consecutive logical addresses are written to the rewritable non-volatile memory module, and the system data having a data length less than a predefined value is temporarily stored to the temporary storage area. When a data or command is not received from the host system within a predefined time, or the logical addresses of the received user data are not consecutive, the system data in the temporary storage area is then written to the rewritable non-volatile memory module. Accordingly, the user data can be stored on consecutive physical addresses, which thereby improves the efficiency of garbage collection.

DESCRIPTION OF THE EMBODIMENTS

Generally, a memory storage device (also referred to as a memory storage system) includes a rewritable non-volatile memory module and a controller (also referred to as a control circuit). The memory storage device is usually used together with a host system, such that the host system can write data to the memory storage device or read data from the memory storage device.

Figure 2:
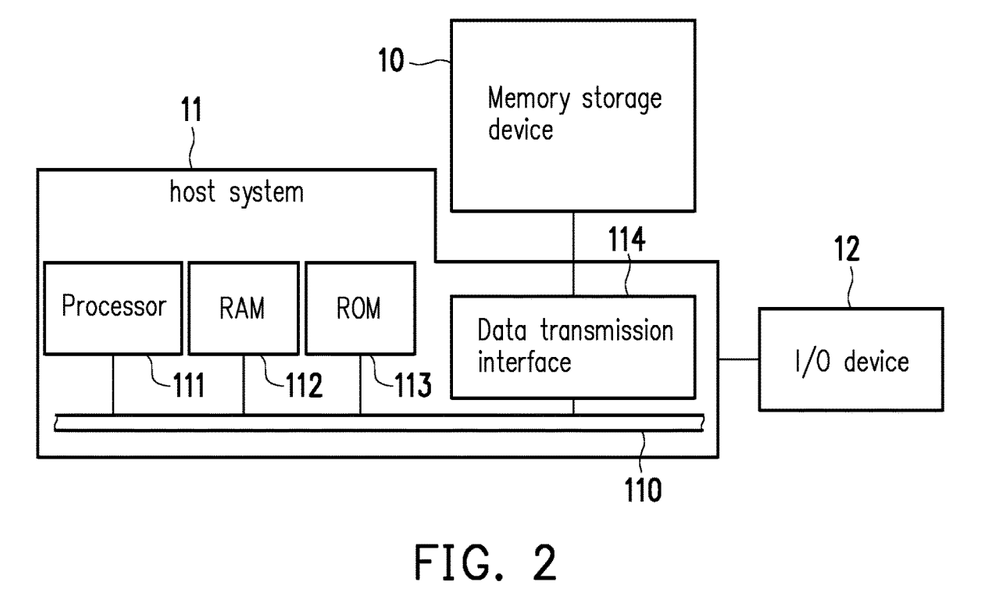
FIG. 2 is a schematic diagram illustrating a host system, a memory storage device, and an input/output (I/O) device according to an exemplary embodiment of the disclosure.
Figure 3:
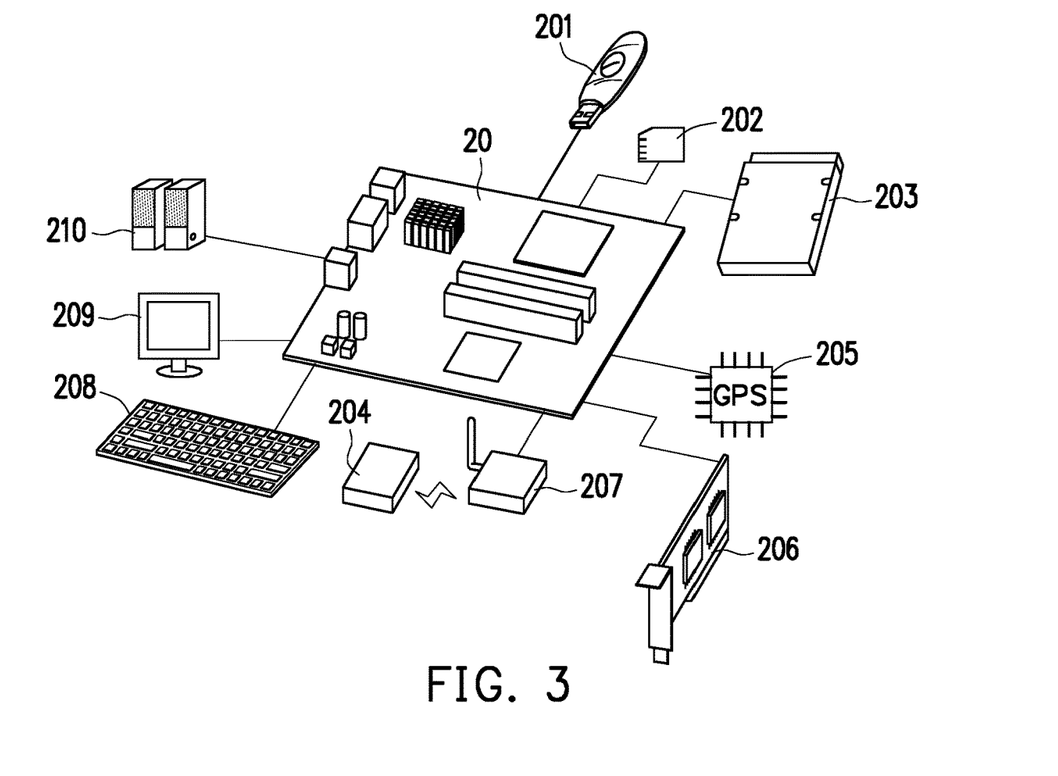
FIG. 3 is a schematic diagram illustrating a host system, a memory storage device, and an I/O device according to another exemplary embodiment of the disclosure.

FIG. 2 is a schematic diagram illustrating a host system, a memory storage device, and an input/output (I/O) device according to an exemplary embodiment of the disclosure. FIG. 3 is a schematic diagram illustrating a host system, a memory storage device, and an I/O device according to another exemplary embodiment of the disclosure.

Referring to FIG. 2 and FIG. 3, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the present exemplary embodiment, the host system 11 is coupled to a memory storage device 10 via the data transmission interface 114. For example, the host system 11 may store data to the memory storage device 10 or read data from the memory storage device 10 via the data transmission interface 114. Moreover, the host system 11 is coupled to the I/O device 12 via the system bus 110. For example, the host system 11 may transmit output signals to the I/O device 12 or receive input signals from the I/O device 12 via the system bus 110.

In the present exemplary embodiment, the processor 111, the random access memory 112, the read only memory 113, and the data transmission interface 114 may be installed on a motherboard 20 of the host system 11. The number of the data transmission interface 114 may be one or more. The motherboard 20 may be coupled to the memory storage device 10 via the data transmission interface 114 in wired or wireless manners. The memory storage device 10 is, for example, a flash drive 201, a memory card 202, a solid state drive (SSD) 203, or a wireless memory storage device 204. The wireless memory storage device 204 is, for example, a memory storage device based on various wireless communication technologies, such as a near field communication (NFC) memory storage device, a WiFi memory storage device, a Bluetooth memory storage device, and a Bluetooth low energy (BLE) memory storage device (e.g., iBeacon). Moreover, the motherboard 20 may also be coupled via the system bus 110 to various I/O devices, such as a global positioning system (GPS) module 205, a network interface card 206, a wireless transmission device 207, a keyboard 208, a display 209, and a speaker 210. For example, in an exemplary embodiment, the motherboard 20 may access the wireless memory storage device 204 via the wireless transmission device 207.

Figure 4:
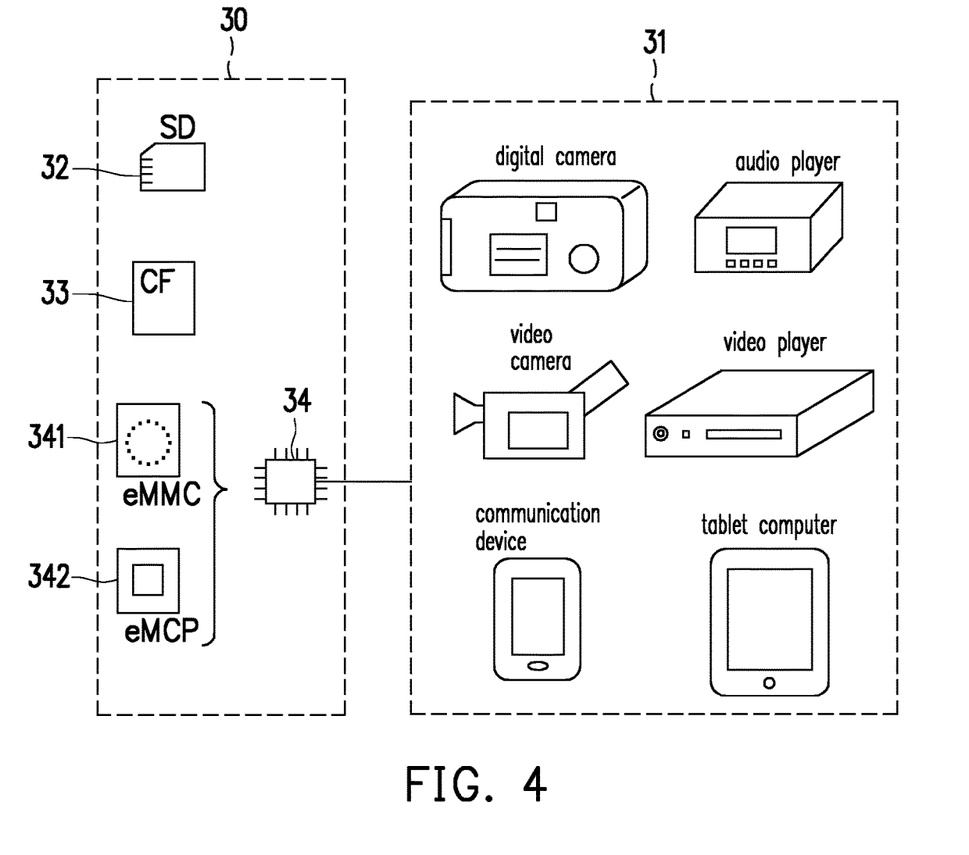
FIG. 4 is a schematic diagram illustrating a host system and a memory storage device according to another exemplary embodiment of the disclosure.

In an exemplary embodiment, the foregoing host system is any system that substantially works with the memory storage device to store data. In the exemplary embodiment above, the host system is illustrated with a computer system. However, FIG. 4 is a schematic diagram illustrating a host system and a memory storage device according to another exemplary embodiment of the disclosure. Referring to FIG. 4, in another exemplary embodiment, a host system 31 may also be a system such as a digital camera, a video camera, a communication device, an audio player, a video player, a tablet computer, etc. A memory storage device 30 may be any one of various types of non-volatile memory storage devices used by the host system 31, such as a secure digital (SD) card 32, a compact flash (CF) card 33, an embedded storage device 34, etc. The embedded storage device 34 is any of various types of embedded storage devices directly coupling a memory module to a substrate of the host system, such as an embedded multi media card (eMMC) 341 and/or an embedded multi chip package (eMCP) storage device 342.

Figure 5:
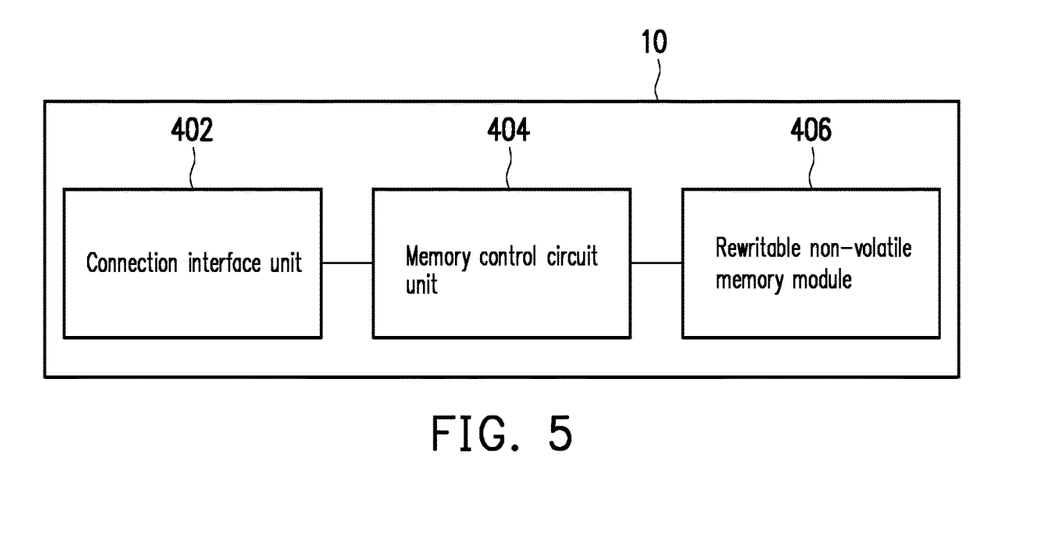
FIG. 5 is a schematic block diagram illustrating a memory storage device according to an exemplary embodiment of the disclosure.

FIG. 5 is a schematic block diagram illustrating a memory storage device according to an exemplary embodiment of the disclosure.

Referring to FIG. 5, the memory storage device 10 includes a connection interface unit 402, a memory control circuit unit 404, and a rewritable non-volatile memory module 406.

The connection interface unit 402 is configured to couple the memory storage device 10 to the host system 11. In the present exemplary embodiment, the connection interface unit 402 is compatible with the Serial Advanced Technology Attachment (SATA) standard. However, it is understood that the disclosure is not limited hereto. The connection interface unit 402 may also be compatible with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the SD interface standard, the Ultra High Speed-I (UHS-I) interface standard, the Ultra High Speed-II (UHS-II) interface standard, the Memory Stick (MS) interface standard, the MCP interface standard, the MMC interface standard, the eMMC interface standard, the Universal Flash Storage (UFS) interface standard, the eMCP interface standard, the CF interface standard, the Integrated Device Electronics (IDE) standard, or other suitable standards. The connection interface unit 402 may be packaged with the memory control circuit unit 404 in one single chip, or the connection interface unit 402 may be disposed outside a chip including the memory control circuit unit 404.

The memory control circuit unit 404 is configured to execute a plurality of logic gates or control commands implemented in a hardware form or a firmware form and perform operations, such as data writing, reading, erasing, etc., in the rewritable non-volatile memory module 406, according to commands of the host system 11.

The rewritable non-volatile memory module 406 is coupled to the memory control circuit unit 404 and is configured to store data written by the host system 11. The rewritable non-volatile memory module 406 may be a single level cell (SLC) NAND flash memory module (i.e., a flash memory module capable of storing 1 bit in one memory cell), a multi level cell (MLC) NAND flash memory module (i.e., a flash memory module capable of storing 2 bits in one memory cell), a triple level cell (TLC) NAND flash memory module (i.e., a flash memory module capable of storing 3 bits in one memory cell), another flash memory module, or any other memory modules with the same characteristics.

In the rewritable non-volatile memory module 406, one or more bits are stored by changing a voltage (hereinafter also referred to as a threshold voltage) of each of the memory cells. More specifically, in each of the memory cells, a charge trapping layer is provided between a control gate and a channel. An amount of electrons in the charge trapping layer may be changed by applying a write voltage to the control gate, thereby changing the threshold voltage of the memory cell. This operation of changing the threshold voltage of the memory cell is also known as "writing data to the memory cell" or "programming the memory cell". As the threshold voltage changes, each of the memory cells in the rewritable non-volatile memory module 406 has a plurality of storage states. The storage state to which a memory cell belongs may be determined by applying a read voltage, thereby obtaining the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store 3 bits or more, the physical programming units on the same word line can be at least classified into a lower physical programming unit, a middle physical programming unit, and an upper physical programming unit. Taking the TLC NAND flash memory as an example, least significant bits (LSBs) of the memory cells located on the same one word line constitute one lower physical programming unit, central significant bits (CSBs) of the memory cells located on the same one word line constitute one middle physical programming unit, and most significant bits (MSBs) of the memory cells located on the same one word line constitute one upper physical programming unit. Generally, in the TLC NAND flash memory, a writing speed of the lower physical programming unit is higher than writing speeds of the middle physical programming unit and the upper physical programming unit, and/or a reliability of the lower physical programming unit is higher than reliabilities of the middle physical programming unit and the upper physical programming unit.

In the present exemplary embodiment, the physical programming unit is the minimal unit for programming. In other words, the physical programming unit is the minimal unit for writing data. For example, the physical programming unit is a physical page or a physical sector. When the physical programming unit is the physical page, the physical programming units usually include a data bit area and a redundancy bit area. The data bit area includes a plurality of physical sectors configured to store user data, and the redundancy bit area is configured to store system data (e.g., management data such as an error correcting code). In the present exemplary embodiment, the data bit area includes 32 physical sectors, and a size of each physical sector is 512 bytes (B). However, in other exemplary embodiments, the data bit area may also include 8 or 16 physical sectors or physical sectors of a greater or smaller number, and the size of each physical sector may also be greater or smaller. On the other hand, the physical erasing unit is the minimal unit for erasing. Namely, each physical erasing unit contains the least number of memory cells to be erased altogether. For example, the physical erasing unit is a physical block.

Figure 6:
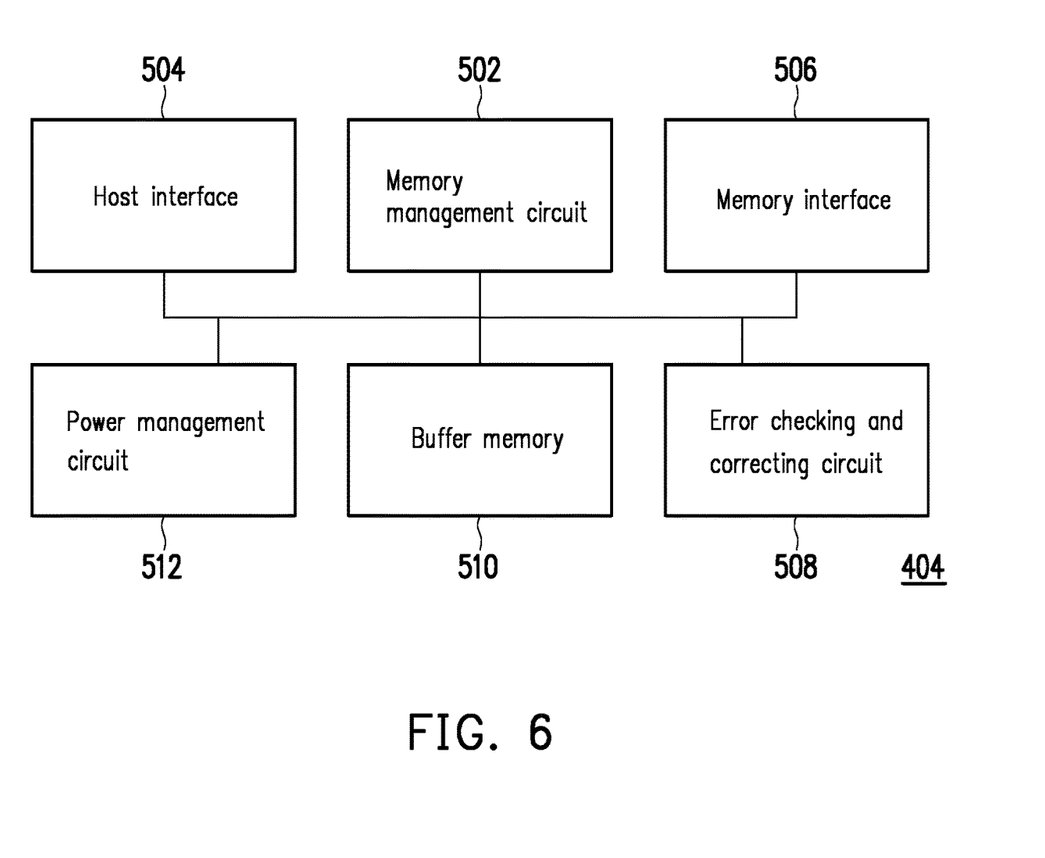
FIG. 6 is a schematic block diagram illustrating a memory control circuit unit according to an exemplary embodiment of the disclosure.

FIG. 6 is a schematic block diagram illustrating a memory control circuit unit according to an exemplary embodiment of the disclosure.

Referring to FIG. 6, the memory control circuit unit 404 includes a memory management circuit 502, a host interface 504, and a memory interface 506.

The memory management circuit 502 is configured to control overall operations of the memory control circuit unit 404. Specifically, the memory management circuit 502 has a plurality of control commands, and when the memory storage device 10 is operated, the control commands are executed to perform operations of data writing, reading, erasing, etc. Hereinafter, the description of operations of the memory management circuit 502 is regarded as equivalent to describing operations of the memory control circuit unit 404.

In the present exemplary embodiment, the control commands of the memory management circuit 502 are implemented in a firmware form. For example, the memory management circuit 502 includes a microprocessor unit (not illustrated) and a read only memory (not illustrated), and the control commands are burnt into the read only memory. When the memory storage device 10 is operated, the control commands are executed by the microprocessor unit to perform operations of data writing, reading, erasing, etc.

In another exemplary embodiment, the control commands of the memory management circuit 502 may also be stored as program codes in a specific area (for example, a system area in a memory module exclusively used for storing system data) of the rewritable non-volatile memory module 406. In addition, the memory management circuit 502 includes a microprocessor unit (not illustrated), a read only memory (not illustrated), and a random access memory (not illustrated). More particularly, the read only memory has a boot code, which is executed by the microprocessor unit to load the control commands stored in the rewritable non-volatile memory module 406 to the random access memory of the memory management circuit 502 when the memory control circuit unit 404 is enabled. Afterwards, the control commands are run by the microprocessor unit to perform operations of data writing, reading, erasing, etc.

Furthermore, in another exemplary embodiment, the control commands of the memory management circuit 502 may also be implemented in a hardware form. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cells of the rewritable non-volatile memory module 406 or a group thereof. The memory writing circuit is configured to issue a write command sequence to the rewritable non-volatile memory module 406 to write data to the rewritable non-volatile memory module 406. The memory reading circuit is configured to issue a read command sequence to the rewritable non-volatile memory module 406 to read data from the rewritable non-volatile memory module 406. The memory erasing circuit is configured to issue an erase command sequence to the rewritable non-volatile memory module 406 to erase data from the rewritable non-volatile memory module 406. The data processing circuit is configured to process data to be written to the rewritable non-volatile memory module 406 and data read from the rewritable non-volatile memory module 406. The write command sequence, the read command sequence, and the erase command sequence may each include one or more program codes or command codes and are configured to instruct the rewritable non-volatile memory module 406 to perform the corresponding operations, such as data writing, reading, and erasing. In an exemplary embodiment, the memory management circuit 502 may further issue command sequences of other types to the rewritable non-volatile memory module 406 to instruct performing corresponding operations.

The host interface 504 is coupled to the memory management circuit 502 and is configured to receive and identify commands and data transmitted by the host system 11. In other words, the commands and the data transmitted by the host system 11 are transmitted to the memory management circuit 502 via the host interface 504. In the present exemplary embodiment, the host interface 504 is compatible with the SATA standard. However, it is understood that the disclosure is not limited hereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 506 is coupled to the memory management circuit 502 and is configured to access the rewritable non-volatile memory module 406. In other words, data to be written to the rewritable non-volatile memory module 406 is converted into a format acceptable by the rewritable non-volatile memory module 406 through the memory interface 506. Specifically, if the memory management circuit 502 is to access the rewritable non-volatile memory module 406, the memory interface 506 transmits corresponding command sequences. For example, the command sequences may include the write command sequence for instructing writing data, the read command sequence for instructing reading data, the erase command sequence for instructing erasing data, and other corresponding command sequences for instructing performing various memory operations (e.g., changing a read voltage level or performing a garbage collection operation). These command sequences are generated by the memory management circuit 502 and are transmitted to the rewritable non-volatile memory module 406 via the memory interface 506, for example. The command sequences may include one or more signals, or data transmitted on the bus. The signals or the data may include command codes or program codes. For example, in a read command sequence, information such as read identification codes and memory addresses is included.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and is configured to perform an error checking and correcting operation to ensure the correctness of data. Specifically, when the memory management circuit 502 receives the write command from the host system 11, the error checking and correcting circuit 508 generates an error correcting code (ECC) and/or an error detecting code (EDC) for data corresponding to the write command, and the memory management circuit 502 writes the data corresponding to the write command and the corresponding error correcting code and/or error detecting code to the rewritable non-volatile memory module 406. Afterwards, when reading the data from the rewritable non-volatile memory module 406, the memory management circuit 502 simultaneously reads the error correcting code and/or the error detecting code corresponding to the data, and the error checking and correcting circuit 508 performs the error checking and correcting operation on the read data according to the error correcting code and/or the error detecting code.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control a power of the memory storage device 10.

Figure 7:
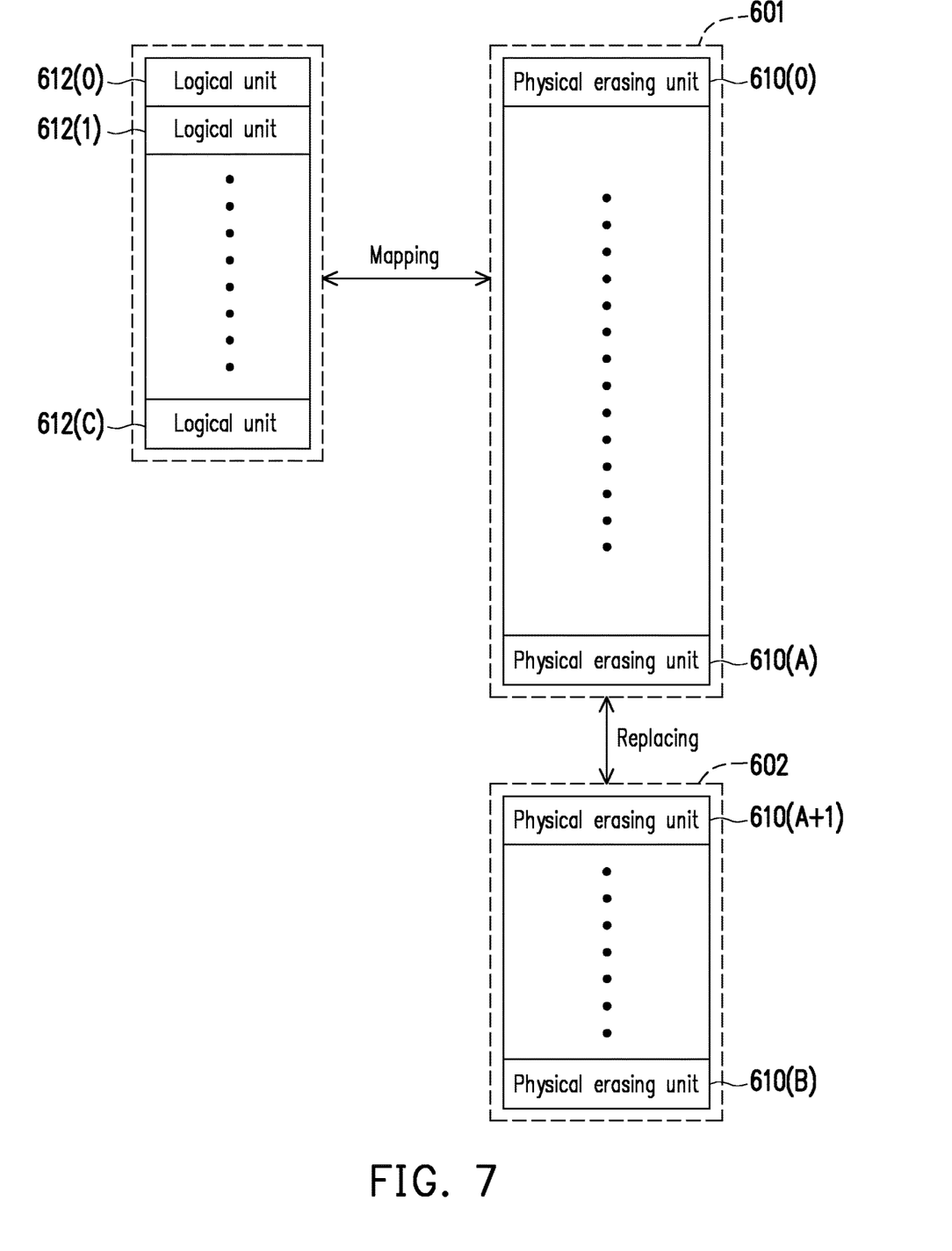
FIG. 7 is a schematic diagram illustrating management of a rewritable non-volatile memory module according to an exemplary embodiment of the disclosure.

FIG. 7 is a schematic diagram illustrating management of a rewritable non-volatile memory module according to an exemplary embodiment of the disclosure.

It should be understood that, in the description of the management of the physical erasing units of the rewritable non-volatile memory module 406 in the following exemplary embodiments, the terms describing the operations (e.g., "select", "group", etc.) on the physical erasing units refer to logical concepts. Namely, the actual positions of the physical erasing units of the rewritable non-volatile memory module 406 are not changed, but the physical erasing units of the rewritable non-volatile memory module 406 are logically operated.

It is noted that in the following description, some terms may be replaced with corresponding abbreviations for ease of reading (see Table 1).

TABLE 1

| | |
|---|---|
| rewritable non-volatile memory module | RNVM module |
| physical erasing unit | PEU |
| physical programming unit | PPU |
| memory management circuit | MMC |
| logical unit | LU |
| logical address | LA |

Referring to FIG. 7, the MMC 502 groups PEUs 610(0) to 610(B) of the RNVM module 406 into a storage area 601 and a spare area 602. For example, the PEUs 610(0) to 610(A) belong to the storage area 601, and the PEUs 610(A+1) to 610(B) belong to the spare area 602. In the present exemplary embodiment, one PEU refers to one PEU. However, in another exemplary embodiment, one PEU may also include a plurality of PEUs. In addition, the MMC 502 may associate one PEU with one of the storage area 601 and the spare area 602 through labeling, for example.

During the operation of the memory storage device 10, the association between one PEU and the storage area 601 or the spare area 602 may be dynamically changed. For example, when receiving the write data from the host system 11, the MMC 502 selects one PEU from the spare area 602 to store at least a portion of the write data and associates the PEU with the storage area 601. In addition, after erasing one PEU belonging to the storage area 601 to remove the data therein, the MMC 502 associates the erased PEU with the spare area 602.

In the present exemplary embodiment, the PEU belonging to the spare area 602 is also referred to as a spare PEU, and the PEU belonging to the storage area 601 is also referred to as a non-spare PEU. Each PEU belonging to the spare area 602 is an erased PEU and does not store any data, and each PEU belonging to the storage area 601 stores data. Furthermore, each PEU belonging to the spare area 602 does not store any valid data, and each PEU belonging to the storage area 601 may store valid data and/or invalid data.

In an exemplary embodiment, the MMC 502 configures LUs 612(0) to 612(C) to map to the PEUs in the storage area 601. In the present exemplary embodiment, the host system 11 accesses the PEU belonging to the storage area 601 through a logical address (LA). Therefore, each LU among the LUs 612(0) to 612(C) refers to one LA. However, in another exemplary embodiment, each LU among the LUs 612(0) to 612(C) may also refer to one logical programming unit, one logical erasing unit, or may be composed of a plurality of consecutive or non-consecutive LAs. Moreover, each LU among the LUs 612(0) to 612(C) may be mapped to one or more PEUs.

In the present exemplary embodiment, the MMC 502 records a mapping relation between the LUs and the PEUs (also referred to as a logical-physical mapping relation) in at least one logical-physical mapping table. When the host system 11 is to read data from the memory storage device 10 or write data to the memory storage device 10, the MMC 502 may perform an access operation on the data of the memory storage device 10 according to the logical-physical mapping table.

Figure 8:
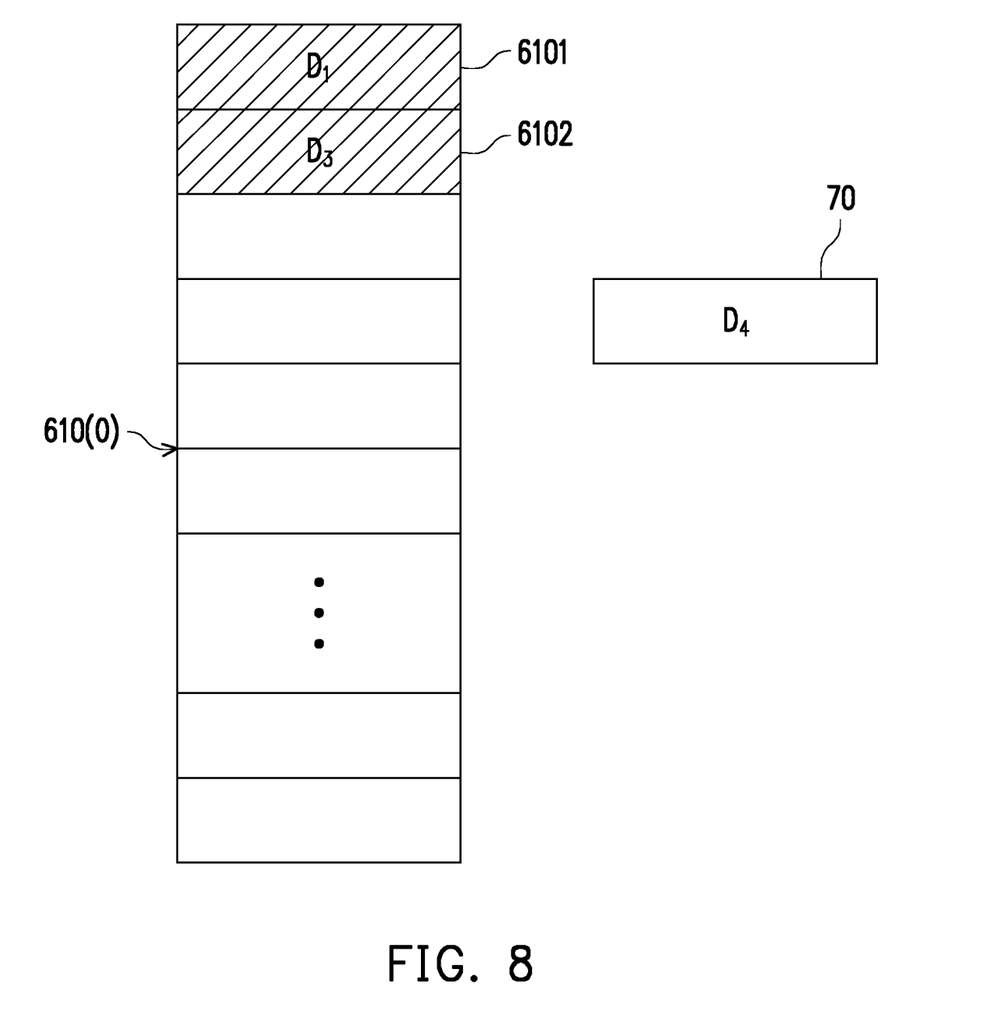
FIG. 8 is a schematic diagram illustrating data writing of a rewritable non-volatile memory module according to an exemplary embodiment of the disclosure.

FIG. 8 is a schematic diagram illustrating data writing of a RNVM module according to an exemplary embodiment of the disclosure.

Referring to FIG. 8, during data writing, the MMC 502 first receives a first data D1 and writes the first data D1 to a PPU 6101 of the PEU 610(0) in the RNVM module 406.

Following the first data D1, the MMC 502 receives a second data D2 from the host system.

The MMC 502 determines whether the data of the second data D2 matches a predefined value. In an exemplary embodiment, the MMC 502 determines whether the data form of the second data D2 matches a predefined format to determine whether the second data D2 is a system data. In another exemplary embodiment, the MMC 502 is configured to determine whether the data length of the second data D2 is less than a predefined value, and the predefined value may be set, for example, to 16 k. If the data length of the second data D2 is less than the predefined value, the MMC 502 determines that the second data D2 belongs to the system data, temporarily stores the second data D2 belonging to the system data to a temporary storage area 70, and records the LA storing the second data D2 and the data length of the second data D2 in the temporary storage area 70. For example, the temporary storage area 70 is configured in the buffer memory 510. In another exemplary embodiment, when the MMC 502 does not receive a data or command from the host system within a predefined time, the MMC 502 writes the second data D2 belonging to the system data in the temporary storage area 70 to a PPU 6102 of the PEU 610(0) in the RNVM module 406.

Following the second data D2, the MMC 502 receives a third data D3 from the host system, and determines whether the LA storing the first data D1 is consecutive with the LA storing the third data D3. If the LA storing the first data D1 is consecutive with the LA storing the third data D3, the MMC 502 writes the third data D3 to the PPU 6102 of the PEU 610(0), and the PPU 6102 is arranged after the PPU 6101.

Following the third data D3, the MMC 502 receives a fourth data D4 from the host system. In particular, if the LA storing the fourth data D4 is the same as the LA recorded in the temporary storage area 70 and the data length of the fourth data D4 is the same as the data length recorded in the temporary storage area 70, the MMC 502 determines that the fourth data D4 is an update system data and temporarily stores the update system data in the temporary storage area 70 to update the second data D2 belonging to the system data.

Figure 9:
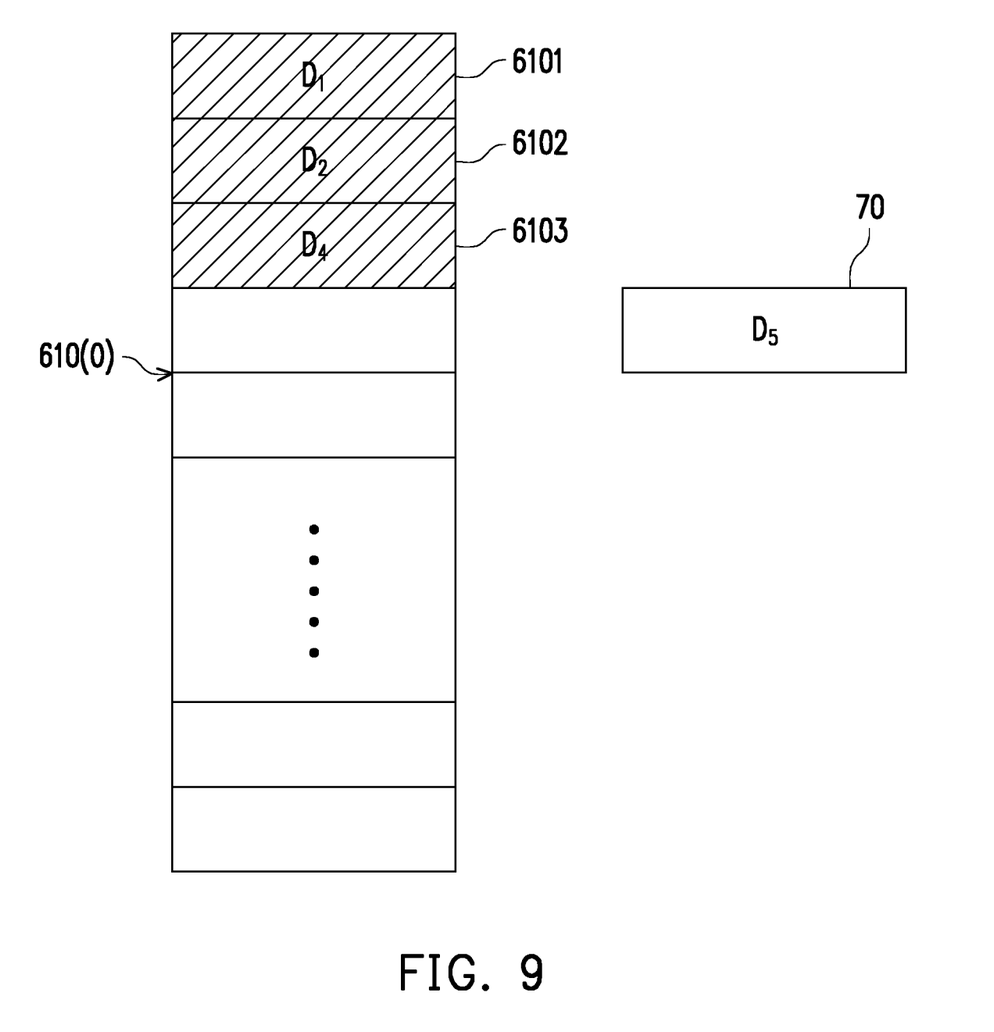
FIG. 9 is a schematic diagram illustrating data writing of a rewritable non-volatile memory module according to another exemplary embodiment of the disclosure.

FIG. 9 is a schematic diagram illustrating data writing of a RNVM module according to another exemplary embodiment of the disclosure.

Referring to FIG. 9, during data writing, the MMC 502 first receives a first data D1 and writes the first data D1 to a PPU 6101 of the PEU 610(0) in the RNVM module 406.

Following the first data D1, the MMC 502 receives a second data D2 from the host system.

The MMC 502 determines whether the data length of the second data D2 is less than a predefined value. In an exemplary embodiment, the predefined value may be set, for example, to 16 k. If the data length of the second data D2 is not less than the predefined value, the MMC 502 determines that the second data D2 belongs to the user data and writes the second data D2 belonging to the user data to a PPU 6102 of the PEU 610(0). The PPU 6102 is arranged after the PPU 6101.

Following the second data D2, the MMC 502 receives a third data D3 from the host system, and the MMC 502 determines whether the data length of the third data D3 is less than the predefined value. If the data length of the third data D3 is less than the predefined value, the MMC 502 determines that the third data D3 belongs to the system data, temporarily stores the third data D3 belonging to the system data to the temporary storage area 70, and records the LA storing the third data D3 and the data length of the third data D3 in the temporary storage area 70.

Following the third data D3, the MMC 502 receives a fourth data D4 from the host system, and determines whether the LA storing the second data D2 is consecutive with the LA storing the fourth data D4. If the LA storing the second data D2 is consecutive with the LA storing the fourth data D4, the MMC 502 writes the fourth data D4 to a PPU 6103 of the PEU 610(0). The PPU 6103 is arranged after the PPU 6102.

Following the fourth data D4, the MMC 502 receives a fifth data D5 from the host system, and if the LA storing the memory data D5 is the same as the LA recorded in the temporary storage area 70 and the data length of the fifth data D5 is the same as the data length recorded in the temporary storage area 70, the MMC 502 determines that the fifth data D5 is an update system data and temporarily stores the update system data in the temporary storage area 70 to update the third data D3 belonging to the system data.

Figure 10:
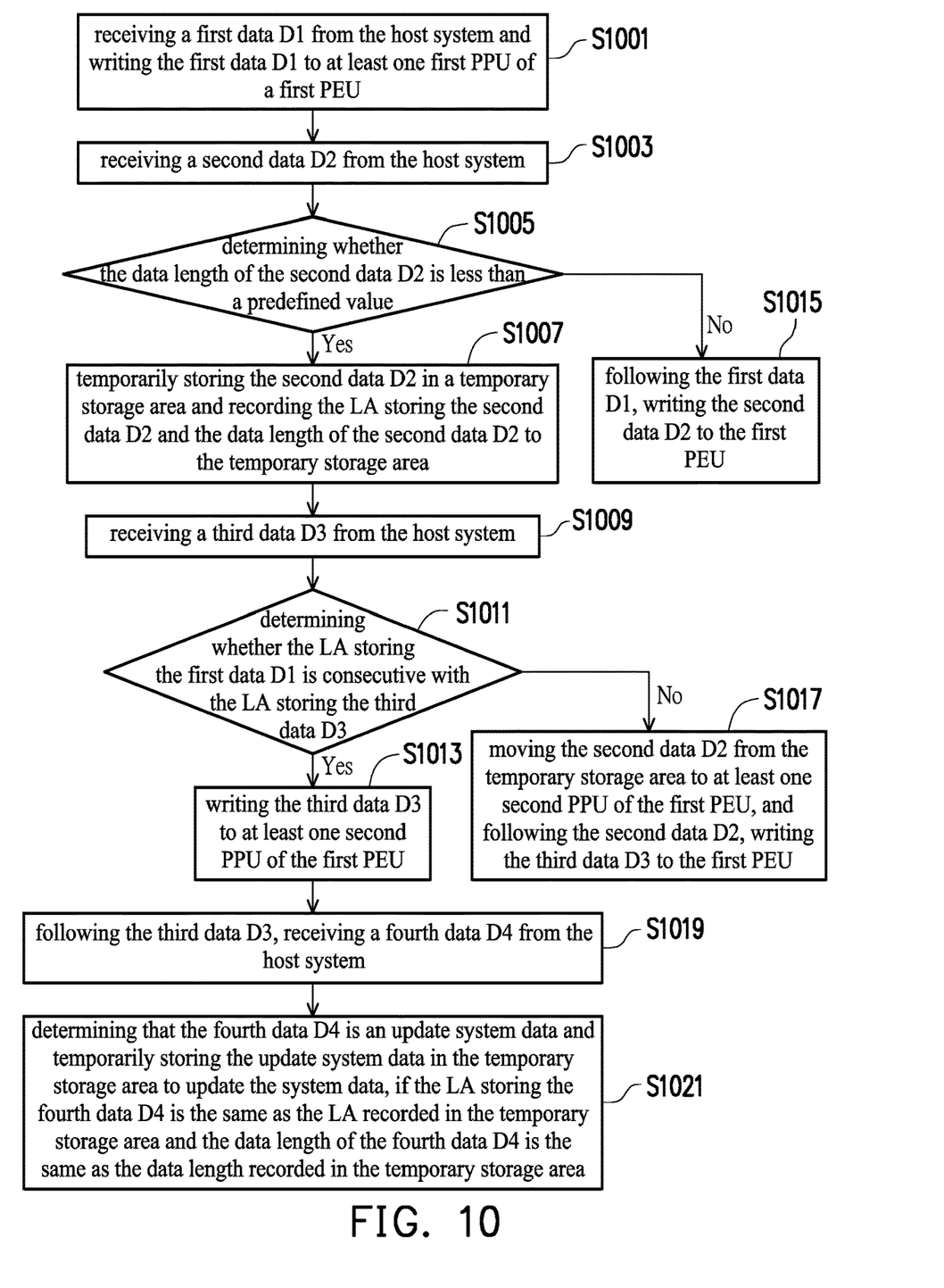
FIG. 10 is a flowchart illustrating a data writing method according to an exemplary embodiment of the disclosure.

FIG. 10 is a flowchart illustrating a data writing method according to an exemplary embodiment of the disclosure.

Referring to FIG. 10, in step S1001, the MMC 502 receives a first data D1 from the host system and writes the first data D1 to at least one first PPU of a first PEU.

In step S1003, the MMC 502 receives a second data D2 from the host system.

In step S1005, the MMC 502 determines whether the data length of the second data D2 is less than a predefined value.

If the data length of the second data D2 is less than the predefined value, in step S1007, the MMC 502 temporarily stores the second data D2 in a temporary storage area and records the LA storing the second data D2 and the data length of the second data D2 to the temporary storage area. The temporary storage area is a volatile memory. In another exemplary embodiment, when the MMC 502 does not receive a data or command from the host system within a predefined time, the MMC 502 writes the second data D2 in the temporary storage area to the RNVM module.

If the data length of the second data D2 is not less than the predefined value, in step S1015, following the first data D1, the MMC 502 writes the second data D2 to the first PEU.

In step S1009, the MMC 502 receives a third data D3 from the host system.

In step S1011, the MMC 502 determines whether the LA storing the first data D1 is consecutive with the LA storing the third data D3.

If the LA storing the first data D1 is consecutive with the LA storing the third data D3, in step S1013, the MMC 502 writes the third data D3 to at least one second PPU of the first PEU. The second PPU is arranged after the first PPU.

If the LA storing the first data D1 is not consecutive with the LA storing the third data D3, in step S1017, the MMC 502 moves the second data D2 from the temporary storage area to at least one second PPU of the first PEU, and following the second data D2, the MMC 502 writes the third data D3 to the first PEU. The first data D1 and third data D3 belong to the user data, and the second data D2 belongs to the system data.

In step S1019, the MMC 502 receives a fourth data D4 from the host system.

In step S1021, if the LA storing the fourth data D4 is the same as the LA recorded in the temporary storage area and the data length of the fourth data D4 is the same as the data length recorded in the temporary storage area, the MMC 502 determines that the fourth data D4 is an update system data and temporarily stores the update system data in the temporary storage area to update the second data D2 belonging to the system data.

In summary of the above, the disclosure provides a data writing method, a memory storage device, and a memory control circuit unit. During data writing, the MMC writes the user data having consecutive LAs to the RNVM module, and temporarily stores the system data conforming to a predefined rule to the temporary storage area. When the MMC does not receive a data or command from the host system within a predefined time, or the LAs of the received user data are not consecutive, the MMC then writes the system data in the temporary storage area to the RNVM module. Accordingly, the user data written to the RNVM module can be physically consecutive, which thereby improves the efficiency of garbage collection.

What is claimed is:

1. A data writing method for a rewritable non-volatile memory module, wherein the rewritable non-volatile memory module comprises a plurality of physical erasing units and each of the physical erasing units has a plurality of physical programming units, the data writing method comprising:
   receiving a first data from a host system and writing the first data to at least one first physical programming unit of a first physical erasing unit among the plurality of physical erasing units;
   receiving a second data from the host system;
   determining whether a data length of the second data is less than a predefined value;
   temporarily storing the second data in a temporary storage area, receiving a third data from the host system after receiving the second data, and determining whether a logical address storing the first data is consecutive with a logical address storing the third data, if the data length of the second data is less than the predefined value;
   writing the third data to at least one second physical programming unit of the first physical erasing unit if the logical address storing the first data is consecutive with the logical address storing the third data; and
   moving the second data from the temporary storage area to at least one second physical programming unit of the first physical erasing unit if the logical address storing the first data is not consecutive with the logical address storing the third data, wherein the at least one second physical programming unit is arranged after the at least one first physical programming unit.

2. The data writing method according to claim 1, further comprising:
recording a logical address storing the second data and the data length of the second data in the temporary storage area.

3. The data writing method according to claim 1, further comprising:
following the first data, writing the second data to the first physical erasing unit if the data length of the second data is not less than the predefined value.

4. The data writing method according to claim 1, wherein the step of moving the second data from the temporary storage area to the at least one second physical programming unit of the first physical erasing unit if the logical address storing the first data is not consecutive with the logical address storing the third data, wherein the at least one second physical programming unit is arranged after the at least one first physical programming unit, further comprises:
following the second data, writing the third data to the first physical erasing unit.

5. The data writing method according to claim 2, wherein the temporary storage area is a volatile memory.

6. The data writing method according to claim 5, further comprising:
writing a data in the temporary storage area to the rewritable non-volatile memory module when a data or command is not received from the host system within a predefined time.

7. The data writing method according to claim 1, wherein the first data and the third data belong to a user data, and the second data belongs to a system data.

8. The data writing method according to claim 7, further comprising:
following the third data, receiving a fourth data from the host system; and
determining that the fourth data is an update system data and temporarily storing the update system data in the temporary storage area to update the second data belonging to the system data, if a logical address storing the fourth data is the same as a logical address recorded in the temporary storage area and a data length of the fourth data is the same as a data length recorded in the temporary storage area.

9. A memory storage device comprising:
a connection interface unit configured to couple to a host system;
a rewritable non-volatile memory module, wherein the rewritable non-volatile memory module comprises a plurality of physical erasing units and each of the physical erasing units has a plurality of physical programming units; and
a memory control circuit unit coupled to the connection interface unit and the rewritable non-volatile memory module,
wherein the memory control circuit unit is configured to receive a first data from the host system and write the first data to at least one first physical programming unit of a first physical erasing unit among the plurality of physical erasing units,
the memory control circuit unit is configured to receive a second data from the host system,
the memory control circuit unit is configured to determine whether a data length of the second data is less than a predefined value,
the memory control circuit unit is configured to temporarily store the second data in a temporary storage area, receive a third data from the host system after receiving the second data, and determine whether a logical address storing the first data is consecutive with a logical address storing the third data, if the data length of the second data is less than the predefined value,
the memory control circuit unit is configured to write the third data to at least one second physical programming unit of the first physical erasing unit if the logical address storing the first data is consecutive with the logical address storing the third data, and
the memory control circuit unit is configured to move the second data from the temporary storage area to at least one second physical programming unit of the first physical erasing unit if the logical address storing the first data is not consecutive with the logical address storing the third data, wherein the at least one second physical programming unit is arranged after the at least one first physical programming unit.

10. The memory storage device according to claim 9, wherein the memory control circuit unit is further configured to record a logical address storing the second data and the data length of the second data in the temporary storage area.

11. The memory storage device according to claim 9, wherein the memory control circuit unit is further configured to, following the first data, write the second data to the first physical erasing unit if the data length of the second data is not less than the predefined value.

12. The memory storage device according to claim 9, wherein in the operation of the memory control circuit unit being further configured to move the second data from the temporary storage area to the at least one second physical programming unit of the first physical erasing unit if the logical address storing the first data is not consecutive with the logical address storing the third data, wherein the at least one second physical programming unit is arranged after the at least one first physical programming unit,
the memory control circuit unit is further configured to, following the second data, write the third data to the first physical erasing unit.

13. The memory storage device according to claim 10, wherein the temporary storage area is a volatile memory.

14. The memory storage device according to claim 13, wherein the memory control circuit unit is further configured to write a data in the temporary storage area to the rewritable non-volatile memory module when a data or command is not received from the host system within a predefined time.

15. The memory storage device according to claim 9, wherein the first data and the third data belong to a user data, and the second data belongs to a system data.

16. The memory storage device according to claim 15, wherein the memory control circuit unit is further configured to, following the third data, receive a fourth data from the host system, and
the memory control circuit unit is further configured to determine that the fourth data is an update system data and temporarily store the update system data in the temporary storage area to update the second data belonging to the system data, if a logical address storing the fourth data is the same as a logical address recorded in the temporary storage area and a data length of the fourth data is the same as a data length recorded in the temporary storage area.

17. A memory control circuit unit configured to write data to a rewritable non-volatile memory module, wherein the rewritable non-volatile memory module comprises a plurality of physical erasing units and each of the physical erasing units has a plurality of physical programming units, the memory control circuit unit comprising:

a host interface configured to couple to a host system;

a memory interface configured to couple to the rewritable non-volatile memory module; and a memory management circuit coupled to the host interface and the memory interface, wherein the memory management circuit is configured to receive a first data from the host system and write the first data to at least one first physical programming unit of a first physical erasing unit among the plurality of physical erasing units, the memory management circuit is configured to receive a second data from the host system, the memory management circuit is configured to determine whether a data length of the second data is less than a predefined value, the memory management circuit is configured to temporarily store the second data in a temporary storage area, receive a third data from the host system after receiving the second data, and determine whether a logical address storing the first data is consecutive with a logical address storing the third data, if the data length of the second data is less than the predefined value, the memory management circuit is configured to write the third data to at least one second physical programming unit of the first physical erasing unit if the logical address storing the first data is consecutive with the logical address storing the third data, and the memory management circuit is configured to move the second data from the temporary storage area to at least one second physical programming unit of the first physical erasing unit if the logical address storing the first data is not consecutive with the logical address storing the third data, wherein the at least one second physical programming unit is arranged after the at least one first physical programming unit.

18. The memory control circuit unit according to claim 17, wherein the memory management circuit is further configured to record a logical address storing the second data and the data length of the second data in the temporary storage area.

19. The memory control circuit unit according to claim 17, wherein the memory management circuit is further configured to, following the first data, write the second data to the first physical erasing unit if the data length of the second data is not less than the predefined value.

20. The memory control circuit unit according to claim 17, wherein in the operation of the memory management circuit being further configured to move the second data from the temporary storage area to the at least one second physical programming unit of the first physical erasing unit if the logical address storing the first data is not consecutive with the logical address storing the third data, wherein the at least one second physical programming unit is arranged after the at least one first physical programming unit, following the second data, the third data is written to the first physical erasing unit.

21. The memory control circuit unit according to claim 18, wherein the temporary storage area is a volatile memory.

22. The memory control circuit unit according to claim 21, wherein the memory management circuit is further configured to write a data in the temporary storage area to the rewritable non-volatile memory module when a data or command is not received from the host system within a predefined time.

23. The memory control circuit unit according to claim 17, wherein the first data and the third data belong to a user data, and the second data belongs to a system data.

24. The memory control circuit unit according to claim 23, wherein the memory management circuit is further configured to, following the third data, receive a fourth data from the host system, and the memory management circuit is further configured to determine that the fourth data is an update system data and temporarily store the update system data in the temporary storage area to update the second data belonging to the system data, if a logical address storing the fourth data is the same as a logical address recorded in the temporary storage area and a data length of the fourth data is the same as a data length recorded in the temporary storage area.

* * * * *